(12) United States Patent
Horita et al.

(10) Patent No.: US 7,174,460 B2
(45) Date of Patent: Feb. 6, 2007

(54) DISTRIBUTED DIGITAL SIGNATURE GENERATION METHOD AND DIGITALLY SIGNED DIGITAL DOCUMENT GENERATION METHOD AND APPARATUS

(75) Inventors: Eiichi Horita, Mitaka (JP); Satoshi Ono, Shibuya-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 849 days.

(21) Appl. No.: 10/080,647

(22) Filed: Feb. 22, 2002

(65) Prior Publication Data
US 2002/0152389 A1    Oct. 17, 2002

(30) Foreign Application Priority Data
Feb. 22, 2001   (JP) ............... 2001-047338

(51) Int. Cl.
*H04L 9/14*    (2006.01)
*H04L 9/00*    (2006.01)
(52) U.S. Cl. ................. 713/176; 380/286
(58) Field of Classification Search ........ 713/180, 713/176; 380/286
See application file for complete search history.

(56) References Cited

U.S. PATENT DOCUMENTS

| | | | | |
|---|---|---|---|---|
| 4,405,829 | A * | 9/1983 | Rivest et al. ............ | 380/30 |
| 5,097,504 | A * | 3/1992 | Camion et al. ........... | 713/176 |
| 5,610,982 | A * | 3/1997 | Micali ................... | 713/180 |
| 5,625,692 | A   | 4/1997 | Herzberg et al. ......... | 380/286 |
| 5,638,447 | A * | 6/1997 | Micali ................... | 713/180 |
| 5,708,714 | A * | 1/1998 | Lopez et al. ............ | 713/180 |
| 5,825,880 | A * | 10/1998 | Sudia et al. ............ | 713/180 |
| 5,960,086 | A * | 9/1999 | Atalla .................. | 380/44 |
| 6,088,798 | A * | 7/2000 | Shimbo .................. | 713/176 |
| 2002/0076052 | A1* | 6/2002 | Yung et al. ............. | 380/277 |
| 2003/0120931 | A1* | 6/2003 | Hopkins et al. .......... | 713/180 |

FOREIGN PATENT DOCUMENTS

EP    0 998 074 A    5/2000

(Continued)

OTHER PUBLICATIONS

Malkin, Michael et al. "Building Intrusion Tolerant Applications," Darpa Information Survivability Conference and Exposition, 2000.*

(Continued)

*Primary Examiner*—Kim Vu
*Assistant Examiner*—Matthew Heneghan
(74) *Attorney, Agent, or Firm*—Kenyon & Kenyon LLP

(57) ABSTRACT

In a distributed digital signature generation method, the method includes the steps of: generating partial signature keys by distributed processes, generating partial digital signatures by using the partial signature keys for the hash value of an input digital document to which additional information such as time is added, combining a predetermined threshold number of partial digital signatures, performing a transformation process on the partial digital signatures according to the combination, and generating an integrated digital signature from the result of the transformation process, in which a least common multiple of predetermined values is used as a transformation number, and it is judged whether an incorrect partial digital signature exists and the number is one, and the incorrect partial digital signature is identified when the number is one.

3 Claims, 13 Drawing Sheets

FOREIGN PATENT DOCUMENTS

| | | |
|---|---|---|
| JP | 8-204697 | 8/1996 |
| JP | 8-251157 | 9/1996 |
| JP | 10-198272 | 12/1996 |
| JP | 9-205422 | 8/1997 |
| JP | 11-098134 | 4/1999 |
| JP | 2001-142398 | 9/2000 |

OTHER PUBLICATIONS

Boneh, D., and Franklin, M., "Efficient Generation of Shared RSA Keys", Proceedings of Crypto, 1997, pp. 425-439.

Wu, et al., "Building Intrusion Tolerant Applications", Proceedings of 8th UNENIX Security Symposium, USENIX, 1999.

Shamir, A., "How to Share a Secret", Communications of ACM, vol. 22, pp. 612-613, 1979.

Miyazaki, Sakurai, Mogi, "On Distributed Cryptographic Protocol for Threshold RSA Signing and Decrypting with No Dealer", IEICE Transactions Fundamentals, vol. E84-A, No. 5, May 2001, pp. 1177-1183.

Rivest, R.L., Shamir, A., Adleman, L., "A Method for Obtaining Digital Signature and Public Key Cryptosystems", Communications of ACM, vol. 21, pp. 1-15, 1978.

Shoup, V., "Practical Threshold Signatures", Proceedings of Eurocrypt '2000, 2000.

Michael Malkin et al. "Building intrusion tolerant applications" Darpa Information Survivability Conference and Exposition, 2000, DISCEX '00. Proceedings Hilton Head, SC, USA Jan 25-27, 2000, Las Alamitos, CA, USA, IEEE Comput. Soc, US, pp. 74-87.

Shingo Miyazaki et al. "On threshold RSA-signing with no dealer" in Proceedings of ICISC'99, pp. 197-207, Springer, 1999.

European Search Report, Dec. 29, 2003.

European Search Report, dated Mar. 16, 2004.

Malkin, Michael et al. "Experimenting with Shared Generation of RSA keys" Proceedings of the Internet Society's 1999 Symposium on Network and Distributed System Security (SNDSS), pp. 43-56.

* cited by examiner

FIG.12

| k | r | A | B | B/A |
|---|---|---|---|---|
| 3 | 5 | 6.5 | 30.9 | 4.75 |
| 4 | 7 | 15.0 | 83.0 | 5.53 |
| 5 | 9 | 26.5 | 165 | 6.23 |
| 6 | 11 | 44.4 | 280 | 6.31 |
| 7 | 13 | 68.9 | 430 | 6.24 |
| 8 | 15 | 92.4 | 617 | 6.68 |
| 9 | 17 | 127.9 | 842 | 6.59 |
| 10 | 19 | 171.4 | 1110 | 6.47 |

FIG.13

| k | r | A | B | C | D | D/B |
|---|---|---|---|---|---|---|
| 3 | 5 | 60.8 | 304.0 | 6,144 | 30,720 | 85 |
| 4 | 7 | 75.1 | 525.7 | 6,144 | 43,008 | 72 |
| 5 | 9 | 94.4 | 849.6 | 6,144 | 55,296 | 59 |
| 6 | 11 | 123.6 | 1359.6 | 6,144 | 67,584 | 46 |
| 7 | 13 | 163.3 | 2122.9 | 6,144 | 79,872 | 35 |
| 8 | 15 | 200.3 | 3004.5 | 6,144 | 92,160 | 29 |
| 9 | 17 | 256.7 | 4363.9 | 6,144 | 104,448 | 23 |
| 10 | 19 | 325.4 | 6182.6 | 6,144 | 116,736 | 18 |

FIG.14

| k | r | A | B | C | D | D/B |
|---|---|---|---|---|---|---|
| 3 | 5 | 60.8 | 382.0 | 12,288 | 61,440 | 161 |
| 4 | 7 | 75.1 | 629.7 | 12,288 | 86,016 | 137 |
| 5 | 9 | 94.4 | 979.6 | 12,288 | 110,592 | 113 |
| 6 | 11 | 123.6 | 1515.6 | 12,288 | 135,168 | 89 |
| 7 | 13 | 163.3 | 2304.9 | 12,288 | 159,744 | 69 |
| 8 | 15 | 200.3 | 3212.5 | 12,288 | 184,320 | 57 |
| 9 | 17 | 256.7 | 4597.9 | 12,288 | 208,896 | 45 |
| 10 | 19 | 325.4 | 6442.6 | 12,288 | 233,472 | 36 |

DISTRIBUTED DIGITAL SIGNATURE GENERATION METHOD AND DIGITALLY SIGNED DIGITAL DOCUMENT GENERATION METHOD AND APPARATUS

BACKGROUND OF THE INVENTION

1. Field of the Invention

The present invention relates to a method and an apparatus for generating an integrated digital signature from distributed digital signatures, and a method and an apparatus for generating a digital document with a digital signature which are used in a service for generating a digital signature for a digital document in which it is assured that the digital signature is not forged one, that is, it is assured that the digital signature is not one generated by other means.

More particularly, the present invention relates to a method and an apparatus for generating an integrated digital signature from distributed digital signatures, and a method and an apparatus for generating a digital document with a digital signature in which a proper integrated digital signature can be generated from partial digital signatures even when a predetermined number of partial digital signature generation systems operate incorrectly.

In addition, the present invention relates to a method and an apparatus for generating an integrated digital signature from distributed digital signatures, and a method and an apparatus for generating a digital document with a digital signature for preventing the risk of theft of secret key in centralized digital signature systems.

In addition, the present invention relates to a method and an apparatus for generating an integrated digital signature from distributed digital signatures, and a method and an apparatus for generating a digital document with a digital signature for preventing weak points in robustness against security attacks and fault tolerance of a conventional distributed signature generation system in which every distributed partial digital signature systems should operate correctly for generating an integrated digital signature.

2. Description of the Related Art

Most of conventional distributed digital signature generation systems based on public-key cryptosystem use a trusted third party when generating a signature key used for the partial digital signature. In this case, there is a possibility that information on the signature key leaks from the third party. That is, the conventional distributed digital signature generation system has a weak point in that safety of the system is impaired if a secret is leaked from one point in the system. In other words, the system has a weak point in that there is a single point of compromise.

In a distributed digital signature generation system in which a digital signature can be generated from partial digital signatures only when every distributed signature system generates correct partial digital signature, there is a weak point for robustness against security attacks and fault tolerance in that the digital signature can not be generated if at least one distributed signature system in the plurality of distributed signature systems operates incorrectly.

A conventional distributed digital signature generation system which tries to overcome the weak point of the secret leaking and the weak point of robustness against security attacks and fault tolerance is disclosed in T. Wu et al.: "Building intrusion tolerant applications", in Proceedings of 8th UNENIX Security Symposium, USENIX, 1999 (which will be referred to as a first conventional method). In this system, partial signature keys are generated by each of partial digital signature generation systems which are distributed by performing distributed processing without using the third party, and partial information on the partial signature key is exchanged each other. Then, the distributed digital signature generation can be performed if a predetermined number, which is called a threshold, of the partial digital signature generation systems in the whole partial digital signature generation systems operate properly.

In addition, a method for preventing key information from increasing is proposed in S. Miyazaki, K. Sakurai, M. Yung "On threshold RSA-signing with no dealer" in Proceedings of ICISC'99, pp. 197–207, Springer, 1999 (which will be referred to as a second conventional method).

In addition, a method for generating an integrated digital signature by combining the threshold number of the partial digital signatures by using the trusted third party, and for solving the problem that key information increases is disclosed in V. Shoup "Practical threshold signatures", in Proceedings of Eurocrypto 2000" (which will be referred to as a third conventional method).

In addition, in Japanese patent application No.8-351565 "key management system having hierarchy, encryption system and distributed digital signature system" (which will be referred to as a fourth conventional method), a distributed digital signature system using threshold distribution of secret keys having hierarchical structure is proposed. The method of threshold distribution of secret keys is based on A. Shamir "How to share a secret" Communications of ACM, Vol.22, pp. 612–613, 1979 in which original secret key is calculated once by using a polynomial interpolation equation for generating the digital signature by distributed processing.

In addition, as a service of providing a timestamp to a digital document by using distributed processing systems based on public-key cryptosystem, there is Japanese patent application No.11-247994 "Distributed type timestamp certification apparatus and method and recording medium recording distributed timestamp certification program" (which will be called a fifth conventional method). The function realized in the system proposed in this document can be realized by using time as additional information which is added to an input digital document. This distributed type time certification apparatus has a feature that every distributed timestamping authority in a plurality of distributed timestamping authorities must generate correct partial timestamp in order to obtain an integrated timestamp, and a feature that correct timestamped certificate can not be issued if a part of the distributed timestamping authorities are incorrect. Thus, it provides means for preventing forgery of timestamped certificate by a part of distributed timestamping authorities.

However, according to the above-mentioned first conventional method, it is necessary that each partial digital signature generation system prepares a different partial signature key according to which group generates the integrated digital signature among groups each including the threshold number of the partial digital signature generation systems. Therefore, there is a problem in that key information increases.

In addition, when a group tries to generate a digital signature, but, fails to generate it since a part of the partial digital signature systems in the group do not function correctly, it is necessary to generate the signature by another group. Thus, there is another problem in that time complexity of generating partial digital signatures by the partial digital signature generation systems and communication between an integrated digital signature generation system and the partial digital signature generation systems increase.

As for the second conventional method, it is possible to solve one problem that the key information increases in the two problems of the first conventional methods. However, the second problem that time complexity of generating partial digital signatures by the partial digital signature generation systems and communication between an integrated digital signature generation system and the partial digital signature generation systems increase when a group fails to generate the signature remains unsolved. In addition, time complexity of generating digital signature from the partial digital signatures increases as the number of the partial digital signature generation systems increases so that there is a problem in that amount of the whole process of generating the signature increases. In addition, time complexity for verifying validity of the partial digital signatures is large. Thus, there is a problem in that time complexity for assuring that only correct partial signature keys are combined for generating an integrated digital signature is large.

The third conventional method is a method for generating the integrated digital signature by combining the threshold number of partial digital signatures and which can solve the problem that key information increases. However, also according to this method, time complexity of generating digital signature from the partial digital signatures increases as the number of the partial digital signature generation systems increases so that there is a problem in that the amount of the whole process of generating the signature increases. In addition, there is a problem in that time complexity for assuring that only correct partial signature keys are combined for generating an integrated digital signature is large.

As for the fourth conventional method, since original secret key is calculated once by a polynomial interpolation equation, the system which performs this calculation can know information of a secret key. Thus, there is a weak point in that a single point of compromise exists. In addition, this document does not disclose a method in which, when a predetermined number of holding systems of secret partial information try to generate a digital signature, and when a part of the partial information holding systems operate incorrectly, it is identified which partial information holding system operates incorrectly, and a digital signature is generated efficiently by using only correct systems by removing the incorrect systems.

As for the distributed type timestamp certification apparatus in the method of the fifth conventional method, there is a weak point in robustness against security attacks and fault tolerance since timestamped certificate can not be generated if at least one distributed timestamping authority functions incorrectly.

SUMMARY OF THE INVENTION

A first object of the present invention is to provide a distributed digital signature generation method and apparatus, a digitally signed digital document generation method and apparatus, a distributed digital signature generation program and a recording medium storing a distributed digital signature generation program for solving the above-mentioned problem of the single point of compromise, and the weak point of robustness against security attacks and fault tolerance that the digital signature can not be generated even when only one partial digital signature system operates incorrectly.

A second object of the present invention is to provide a distributed digital signature generation method and apparatus, a digitally signed digital document generation method and apparatus, a distributed digital signature generation program and a recording medium storing a distributed digital signature generation program for solving the above-mentioned problem that the time complexity of generating partial digital signatures by the partial digital signature generation systems and communication between an integrated digital signature generation system and the partial digital signature generation systems increase when a group including the threshold number of the partial digital signature systems tries to generate a digital signature, but, fails to generate it.

A third object of the present invention is to provide a distributed digital signature generation method and apparatus, a digitally signed digital document generation method and apparatus, a distributed digital signature generation program and a recording medium storing a distributed digital signature generation program for solving the problem that the time complexity for generating the digital signature from the partial digital signatures is large.

A fourth object of the present invention is to provide a distributed digital signature generation method and apparatus, a digitally signed digital document generation method and apparatus, a distributed digital signature generation program and a recording medium storing a distributed digital signature generation program for solving the problem that time complexity for assuring that only correct partial signature keys are used for generating an integrated digital signature is large.

The above object can be achieved by a distributed digital signature generation method for generating a digital signature for a digital document by using a plurality of partial digital signature generation parts, the distributed digital signature generation method including the steps of:

each of the partial digital signature generation parts generating a partial signature key by communicating with each other without using a trusted third party;

each of the partial digital signature generation parts generating a partial digital signature by using the partial signature key for a hash value of an input digital document;

each of the partial digital signature generation parts outputting the partial digital signature or a pair of the digital document and the partial digital signature;

combining a predetermined number of partial digital signatures generated by the partial digital signature parts wherein the predetermined number is a threshold;

performing a transformation process on each of the predetermined number of partial digital signatures according to combination of the predetermined number of partial digital signatures; and generating an integrated digital signature from a result of the transformation process.

In the distributed digital signature generation method, a least common multiple of predetermined values may be used as a transformation number in the transformation process.

That is, as will be described in the embodiments of the present invention, since a least common multiple of $\delta$ $(I,r(1)), \ldots, \delta (I,r(K))$ is used instead of $((r-1)!)^2$ as the transformation number $\Delta (I)$ in $\Delta (I) \cdot \lambda (I,i)$, the time complexity of generating the integrated digital signature from the partial digital signatures can be decreased. Here, $\delta$ $(I,r(1)), \ldots, \delta (I,r(K))$ are positive numbers as determined shown in FIG. 5.

The distributed digital signature generation method may further include the step of:

judging whether an incorrect partial digital signature generated by an incorrect partial signature key exists, and identifying the incorrect partial digital signature by combining the predetermined number of the partial digital signatures and performing a signature verification process.

By combining the threshold number of partial digital signatures, using a set of I(0), . . . , I(m−1) each including k partial digital signatures as shown in FIG. 6, the time complexity of verification can be decreased.

The above object is also achieved by a distributed digital signature generation method for generating a digital signature for a digital document by using a plurality of partial digital signature generation parts, the method comprising the steps of:

each of the partial digital signature generation parts adding one or more items of additional information to an input digital document to generate a digital document with additional information;

each of the partial digital signature generation parts generating a partial signature key by communicating with each other without using a trusted third party;

each of the partial digital signature generation parts generating a partial digital signature by using the partial signature key for a hash value of the digital document with additional information;

each of the partial digital signature generation parts outputting a pair of the digital document with additional information and the partial digital signature;

combining a predetermined number of the pairs of the digital document with additional information and the partial digital signature wherein the predetermined number is a threshold;

performing a transformation process on each of the predetermined number of partial digital signatures according to combination of the predetermined number of pairs; and generating an integrated digital signature from a result of the transformation process.

In addition, the above object is also achieved by a distributed digital signature generation apparatus for generating a digital signature for a digital document by using a plurality of partial digital signature generation parts, wherein:

each of the partial digital signature generation parts generates a partial signature key by communicating with each other without using a trusted third party;

each of the partial digital signature generation parts generates a partial digital signature by using the partial signature key for a hash value of an input digital document;

each of the partial digital signature generation parts outputs the partial digital signature or a pair of the digital document and the partial digital signature;

the distributed digital signature generation apparatus comprising:

a part for combining a predetermined number of partial digital signatures generated by the partial digital signature parts wherein the predetermined number is a threshold;

is a part for performing a transformation process on each of the predetermined number of partial digital signatures according to combination of the predetermined number of partial digital signatures; and a part for generating an integrated digital signature from a result of the transformation process.

In addition, the above object is also achieved by a distributed digital signature generation apparatus for generating a digital signature for a digital document by using a plurality of partial digital signature generation parts, wherein:

each of the partial digital signature generation parts adds one or more items of additional information to an input digital document to generate a digital document with additional information;

each of the partial digital signature generation parts generates a partial signature key by communicating with each other without using a trusted third party;

each of the partial digital signature generation parts generates a partial digital signature by using a partial signature key for a hash value of the digital document with additional information;

each of the partial digital signature generation parts outputs a pair of the digital document with additional information and the partial digital signature;

the distributed digital signature generation apparatus comprising:

a part for combining a predetermined number of the pairs of the digital document with additional information and the partial digital signature wherein the predetermined number is a threshold;

a part for performing a transformation process on each of the predetermined number of partial digital signatures according to combination of the predetermined number of pairs; and a part for generating an integrated digital signature from a result of the transformation process.

In addition, the above object is also achieved by a digitally signed digital document generation method for generating a digital document with a digital signature generated by using a plurality of partial digital signature generation parts, the digitally signed digital document generation method comprising the steps of:

each of the partial digital signature generation parts generating a partial signature key by communicating with each other without using a trusted third party;

each of the partial digital signature generation parts generating a partial digital signature by using the partial signature key for a hash value of an input digital document;

each of the partial digital signature generation parts outputting the partial digital signature or a pair of the digital document and the partial digital signature;

combining a predetermined number of partial digital signatures generated by the partial digital signature parts wherein the predetermined number is a threshold;

performing a transformation process on each of the predetermined number of partial digital signatures according to combination of the predetermined number of partial digital signatures;

generating an integrated digital signature from a result of the transformation process; and generating a digital document with digital signature which includes the digital document and the integrated digital signature.

In addition, the above object is also achieved by a program for causing a computer to generate a digital signature for a digital document by using a plurality of partial digital signature generation parts, wherein:

each of the partial digital signature generation parts generates a partial signature key by communicating with each other without using a trusted third party;

each of the partial digital signature generation parts generates a partial digital signature by using the partial signature key for a hash value of an input digital document;

each of the partial digital signature generation parts outputs the partial digital signature or a pair of the digital document and the partial digital signature;

the program comprising:

program code means for combining a predetermined number of partial digital signatures generated by the partial digital signature parts wherein the predetermined number is a threshold;

program code means for performing a transformation process on each of the predetermined number of partial digital signatures according to combination of the predetermined number of partial digital signatures; and program code means for generating an integrated digital signature from a result of the transformation process.

In addition, the above object is also achieved by a computer readable medium storing the program.

BRIEF DESCRIPTION OF THE DRAWINGS

Other objects, features and advantages of the present invention will become more apparent from the following detailed description when read in conjunction with the accompanying drawings, in which:

FIG. 12 is a table showing decreasing effect of time complexity by optimization when the integrated digital signature is generated from the partial digital signatures; and FIGS. 13 and 14 are tables showing decreasing effect of time complexity for verification of partial signatures.

DETAILED DESCRIPTION OF THE PREFERRED EMBODIMENTS

Figure 1:
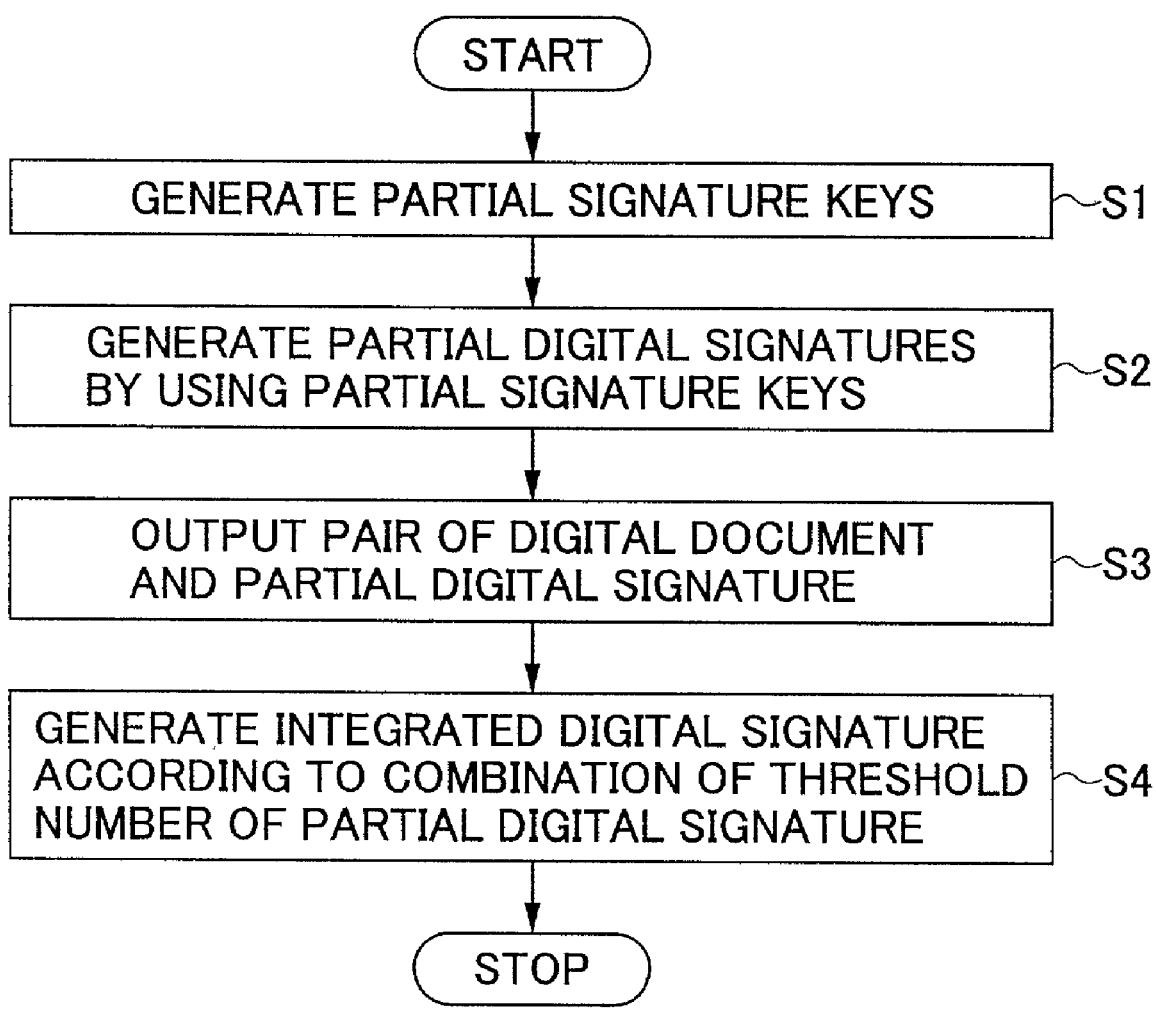
FIG. 1 is a figure for explaining the principle of the present invention.

FIG. 1 shows the principle of the present invention. According to the distributed digital signature generation method of the present invention, each of partial digital signature generation parts generates a partial signature key by communicating with each other without using a trusted third party in step 1. Then, each of the partial digital signature generation parts generates a partial digital signature by using the partial signature key for the hash value of an input digital document in step 2. In step 3, each of the partial digital signature generation parts outputs the partial digital signature or a pair of the digital document and the partial digital signature. After that, a predetermined number of partial digital signatures generated by the partial digital signature parts are combined, with the predetermined number being the threshold, a transformation process is performed on each of the predetermined number of partial digital signatures according to the predetermined number of partial digital signatures which are combined; and an integrated digital signature is generated from the result of the transformation process in step 4.

Figure 2:
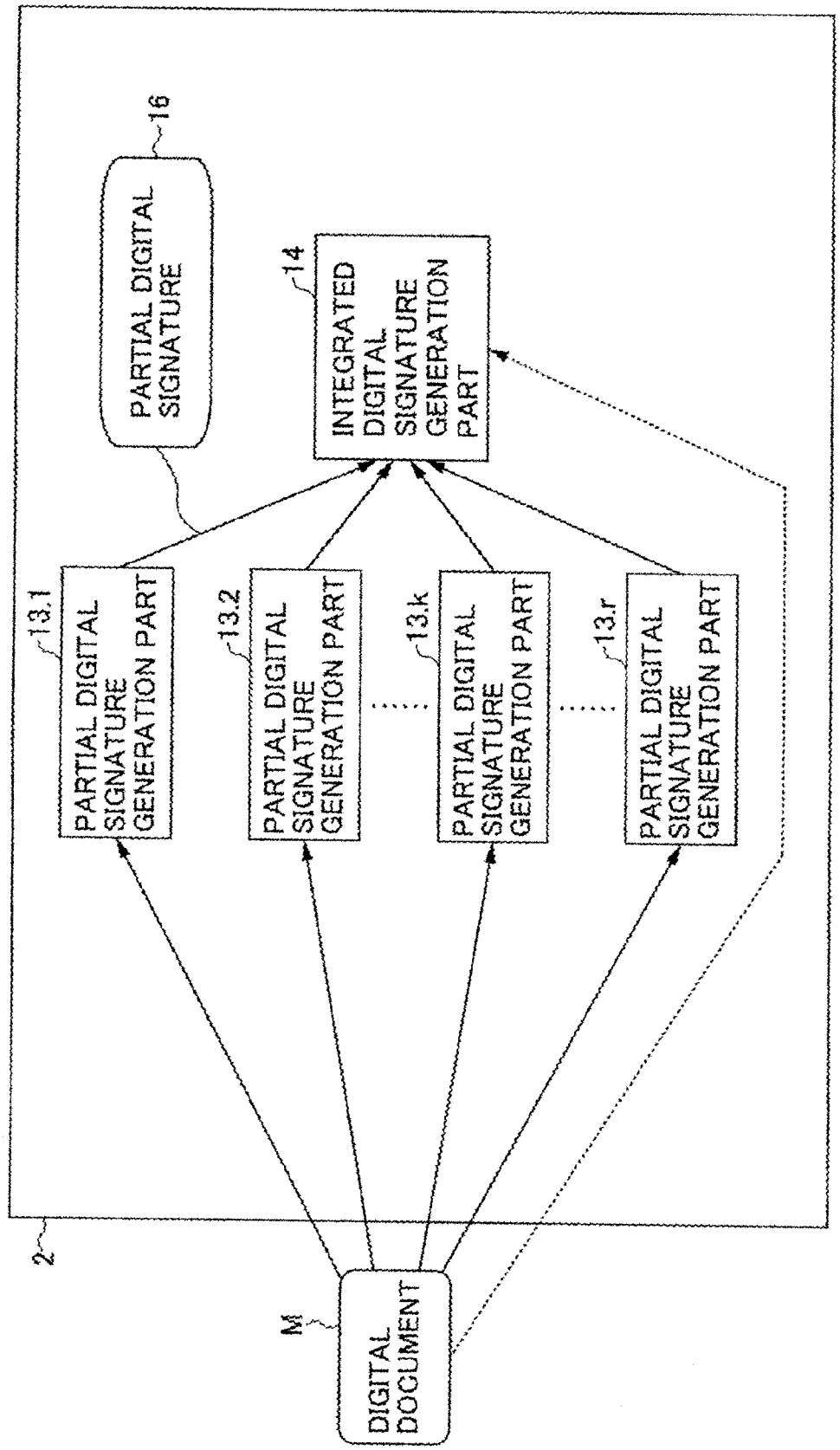
FIG. 2 shows a block diagram of a distributed digital signature generating apparatus (first example) by using a threshold number of partial signatures.
Figure 3:
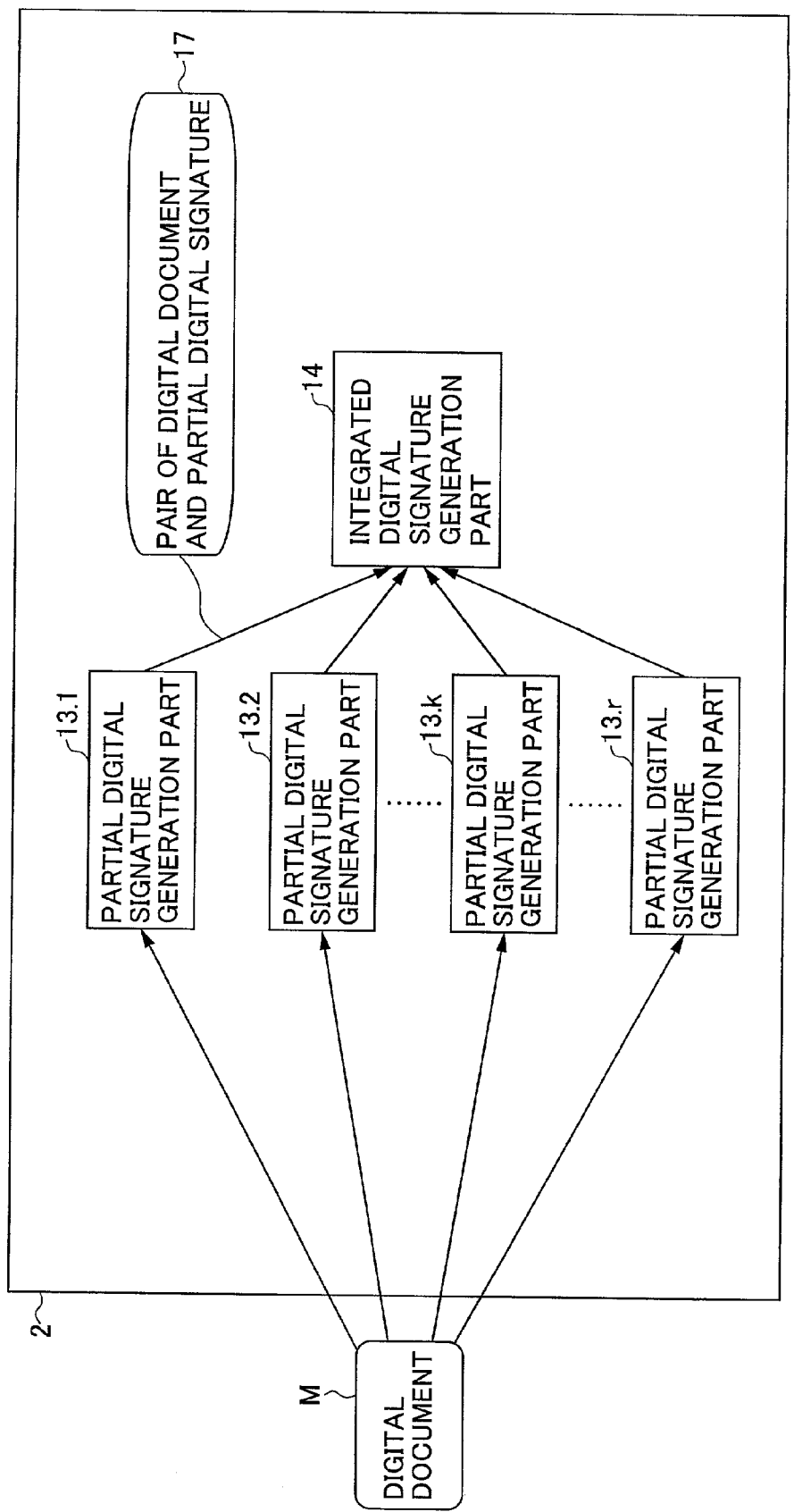
FIG. 3 shows a block diagram of a distributed digital signature generation apparatus (second example) by using a threshold number of partial signatures.
Figure 4:
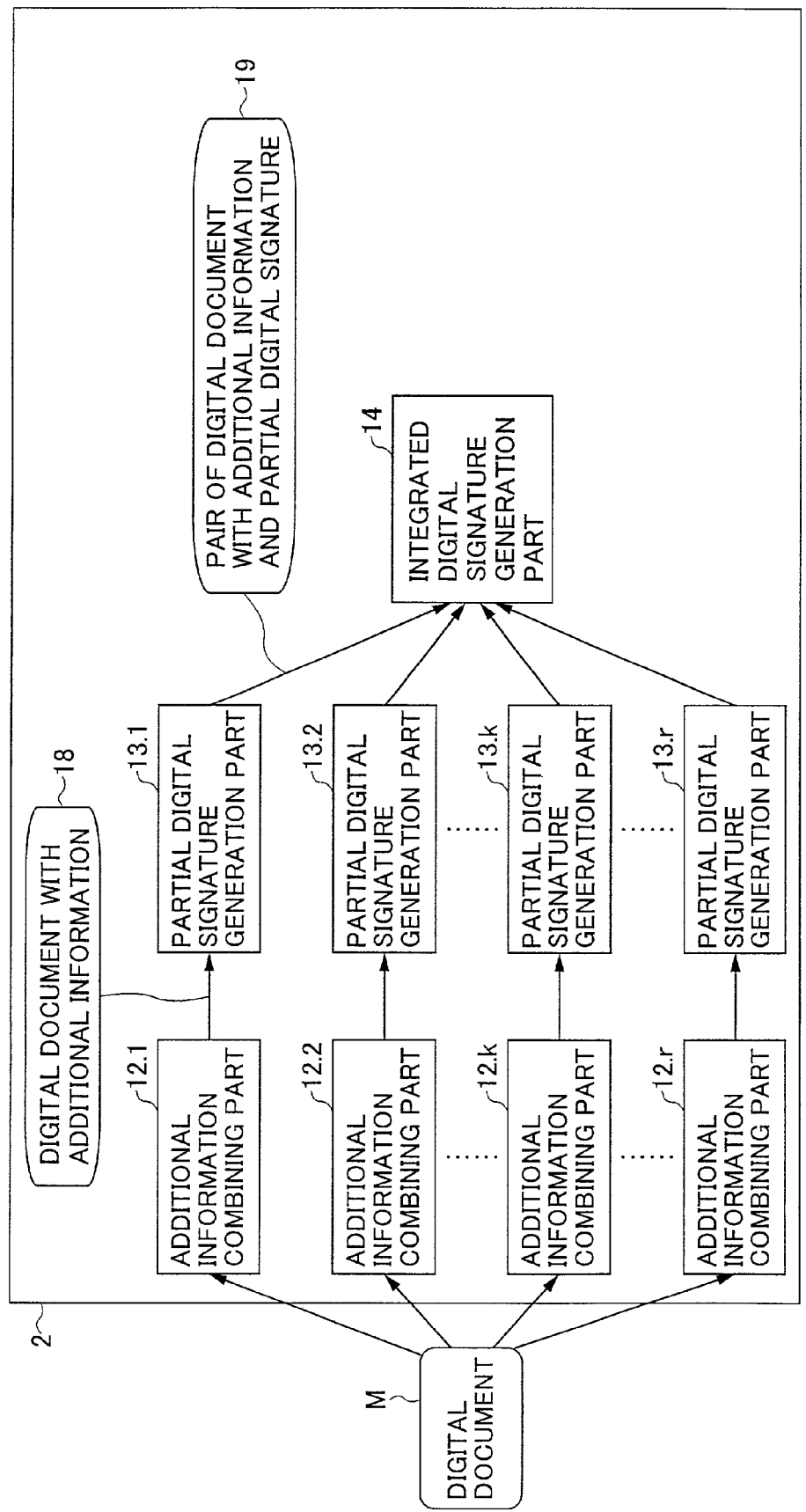
FIG. 4 shows a block diagram of a distributed digital signature generation apparatus (third example) by using a threshold number of partial signatures.

In the present invention, three threshold distributed digital signature generation apparatuses shown in FIGS. 2–4 are proposed.

FIG. 2 shows a block diagram of the threshold distributed digital signature generation apparatus (first example).

As shown in the figure, the distributed digital signature generation apparatus 2 includes a certain number of partial digital signature generation parts 13 and an integrated digital signature generation part 14.

The partial digital signature generation parts 13 generate partial digital signatures $S_1(M), \ldots, S_r(M)$ for an input digital document M independently with each other.

The integrated digital signature generation part 14 receives m partial digital signatures $S_{r(1)}(M), \ldots, S_{r(m)}(M)$, ($k \leq m \leq r$ and $1 \leq r(1), \ldots, r(m) \leq r$) which are generated by the plurality of partial digital signature generation parts 13 independently and the digital document M. Then, the integrated digital signature generation part 14 generates one or more of integrated digital signatures $S(M, I_1), \ldots, S(M, I_s)$ from the output partial digital signatures for s sets $I_1, \ldots, I_s$ each consisting of identification numbers of k partial digital signature generation parts 13, where s is equal to or larger than 1 and k is the predetermined threshold number.

FIG. 3 shows a block diagram of the threshold distributed digital signature generation apparatus (second example) of the present invention.

The "Pair Of Digital Document and Partial Digital Signature" 17 is shown in FIG. 3.

The configuration of the digital signature generation apparatus 1 shown in FIG. 3 is the same as that shown in FIG. 2. The partial digital signature generation parts 13 generate pairs of the digital document and the partial digital signature $(M, S_1(M)), \ldots, (M, S_r(M))$ for the input digital document M independently with each other.

The integrated digital signature generation part 14 receives m pairs $(M, S_{r(1)}(M)), \ldots, (M, S_{r(m)}(M))$ of the digital document M and the partial digital signatures which are generated by the partial digital signature generation parts 13 independently $(M, S_{r(1)}(M)), \ldots, (M, S_{r(m)}(M))$, ($k \leq m \leq r$ and $1 \leq r(1), \ldots, r(m) \leq r$). Then, the integrated digital signature generation part 14 generates one or more of integrated digital signatures $S(M, I_1), \ldots, S(M, I_s)$ from the output partial digital signatures for s sets $I_1, \ldots, I_s$ each consisting of identification numbers of k partial digital signature generation parts 13, where s is equal to or larger than 1 and k is the predetermined threshold number.

FIG. 4 shows a block diagram of the threshold distributed digital signature generation apparatus (third example) of the present invention. As shown in the figure, the distributed digital signature generation apparatus 1 includes a certain number of additional information combining parts 12, a certain number of partial digital signature generation parts 13 and an integrated digital signature generation parts 14.

The "Digital Document With Additional Information" 18 and the "Pair Of Digital Document With Additional Information And Partial Digital Signature" 19 are shown in FIG. 4.

Each of the additional information combining parts 12 (the additional information combining parts 12.i) generates $v(i)$ items of additional information $\alpha(i,1), \ldots, \alpha(i, v(i))$ for the input digital document M independently, where $v(i)$ is a number equal to or larger than 1, and generates digital documents with additional information $M\|\alpha(i,1), \ldots, M\|\alpha(i, v(i))$ which are generated by combining the additional information $\alpha(i,1), \ldots, \alpha(i, v(i))$ and the digital document M. The digital signature generation parts 13i ($1 \leq i \leq r$) correspond to the additional information combining parts 12.1 ..., 12.r respectively. Each of the digital signature generation parts (the digital signature generation part 13.i) generates pairs of the digital document with the additional information and the partial digital signature ($M\|\alpha(i,1), S_1(M\|\alpha(i,1))), \ldots, (M\|\alpha(i, v(i)), S_i(M\|\alpha(i, v(i))))$ for the digital document with additional information generated by the corresponding additional information combining part 12.i.

The integrated digital signature generation part 14 selects m pairs of the digital document with additional information $M\|\alpha(i,h(i))$ and the partial digital signature $(M',S_{r(1)}(M')), \ldots, (M',S_{r(m)}, (M'))$, where $k \leq m \leq r$ and $1 \leq r(1), \ldots, r(m) \leq r$ and $M' \in \{M\|\alpha(r(i),1), \ldots, M\|\alpha(r(i), v(i)))\}$ ($1 \leq i \leq m$) are satisfied. In addition, the integrated digital signature generation part 14 selects s sets $I_1, \ldots, I_s \subset \{r(1), \ldots, r(m)\}$ each consisting of identification numbers of k partial digital signature generation parts 13 and generates s integrated digital signatures $S(M',I_1), \ldots, S(M',I_s)$, where k is the predetermined threshold number and s is equal to or larger than 1.

The additional information which is combined by the additional information combining part 12 can be identification information of the digital signature generation system, the term of validity of digital signature, the time of generating digital signature or combination of these.

EXAMPLES

In the following, examples of the present invention will be described with reference to figures.

In the following, an example of digital signature generation will be described by using FIGS. 2, 3 and 4. In this example, RSA is used as an example of public-key cryptosystem. RSA is described, for example, in R. L Rivest, A. Shamir, and L. Adleman "A method for obtaining digital signature and public key cryptosystems" Communications of ACM, Vol.21, pp. 120–126, 1978.

First, a preparation procedure between the partial digital signature generation parts for generating partial digital signatures will be described.

It is assumed that N is a product of two prime numbers which are large enough, $\phi(N)$ is the number of integers i which are relatively prime with N, where $0 \leq i < N$. Then, it is assumed that e is an integer which does not have a factor smaller than the number r of the partial digital signature generation parts 13 and which is relatively prime to $\phi(N)$. It is assumed that the pair of N and e (N,e) is the public key.

A set of integers $d_1, \ldots, d_r$ which satisfies $e \cdot (d_1 + \ldots d_r) \equiv 1$ mod $\phi(N)$ is generated by using a method R proposed in D. Boneh et al.: Efficient generation of shared RSA key (extended abstract), in "Proceedings Crypto'97 (Springer, 1997), such that each partial digital signature generation part 13 (for each i=1, ..., r) has $d_i$.

Here, $d = (d_1 + \ldots d_r)$ becomes the secret key corresponding to the public key (N,e). Each partial digital signature generation part 13i shown in FIGS. 2, 3, 4 knows only $d_i$, and any other partial digital signature generation part 13 does not know it. In addition, the integrated digital signature generation part 14 does not know d.

Each partial digital signature generation part 13i selects k integer coefficients $a_{i,0} = d_i, a_{i,1}, \ldots, a_{i,k-1}$ which are large enough, where k is the minimum number of partial signatures necessary for distributed signature generation, that is, k is the threshold, and a polynomial $f_i(x)$ is defined as $f_i(x) = a_{i,0} + a_{i,1} \cdot x + \ldots + a_{i,k-1} \cdot x^{k-1}$ ($1 \leq i \leq r$).

The partial digital signature generation part 13i calculates $f_i(j)$ for each integer j which satisfies $1 \leq j \leq r$ and $j \neq i$, and sends $f_i(j)$ to a partial digital signature generation part 13j, and calculates $f_i(i)$.

The partial digital signature generation part 13i calculates the sum of $f_j(i)$ sent from the other partial digital signature generation parts (partial digital signature generation part 13j) ($j \neq i$ and $1 \leq j \leq r$) and $f_i(i)$ calculated by itself, and put the sum as D(i), that is, $$D(i) = \sum_{1 \leq j \leq r} f_j(i).$$

D(i) is called a partial signature key of the partial digital signature generation part 13i.

Next, procedure for partial digital signature generation in each partial digital signature generation part 13 will be described.

In the configuration shown in FIGS. 2 and 3, each partial digital signature part 13i calculates $S_i(M) = H(M)^{D(i)}$ mod N($1 \leq I \leq r$) for the input digital document M by using a proper hash function (for example, SHA-1 and MD5) whose range is included in $\{0, 1, \ldots, N-1\}$. $S_i(M)$ is defined as a partial digital signature 16 for M.

Each partial digital signature generation part 13i shown in FIG. 4 calculates $S_1(M\|\alpha(i,j)) = H(M\|\alpha(i,j))^{D(i)}$ mod N for the digital document $M\|\alpha(i,j)$ with additional information output from the additional information combining part 12, by using a proper hash function (for example, SHA-1 and MD5) whose range is included in $\{0,1, \ldots, N-1\}$, and defines $S_1(M)$ as a partial digital signature for $M\|\alpha(i, j)$ ($i \leq i \leq r$).

Next, the procedure of the integrated digital signature generation in the integrated digital signature generation part 14 will be described.

M is called a digital document to be signed of the partial digital signature $S_1(M)$ generated by the partial digital signature generation part 13i shown in FIGS. 2 and 3. For the partial digital signature $S_i(M\|\alpha(i,j))$ generated by the partial digital signature generation part 13i shown in FIG. 4, the digital document with the additional information $M\|\alpha(i,j)$ is called a digital document to be signed of the partial digital signature.

When assuming that $1 \leq r(1), \ldots, r(k) \leq r$ and $r(1), \ldots r(k)$ are different from each other, and $S_{r(1)}(M'), \ldots, S_{r(k)}(M')$ is a set of threshold number of partial digital signatures such that the digital document to be signed coincides with M' for each partial digital signature, the procedure for generating the integrated digital signature S(M',I) on the basis of the partial digital signatures $S_{r(1)}(M'), \ldots, S_{r(k)}(M')$ by the integrated digital signature generation part 14 is as follows. Setting $I=\{r(1), \ldots r(k)\}$, and $$\lambda(I, i) = \prod_{j \in I, j \neq i} \frac{j}{j-i}$$

for each i∈I, a positive integer Δ(I) is selected such that Δ(I) and e are relatively prime and Δ(I)·λ(I,i) becomes an integer for each i∈I. In the following, Δ(I) will be called a transformation number of partial digital signatures for I. Although the transformation number can be chosen to be $((r-1)!)^2$ irrespective of I as proposed in the S. Miyazaki, K. Sakurai, M. Yung "On threshold RSA-signing with no dealer" in Proceedings of ICISC799, pp. 197–207, Springer, 1999, for example, it is possible to select a different number such that the time complexity for generating the integrated digital signature becomes small as described in the following.

Λ(I,i)=Δ(I)·λ(I,i) is calculated for each i∈I. Then, transformation processing is performed on the partial digital signature by taking $S_{r(i)}(M')$ to the power of Λ(I,i) mod N, and let $T_{r(i)}(M')$ be the result. That is, $T_{r(i)}(M')=S_{r(i)}(M')^{\Lambda(I,i)}$ mod N.

Then, $T_{r(i)}(M'), \ldots, T_{r(k)}(M')$ are multiplied and $$w(I) = \left( \prod_{i \in I} T_{r(i)}(M') \right) \bmod N$$

is calculated. Since Δ(I) and e are relatively prime, integers a(I) and b(I) which satisfies Δ(I)·a(I)+e·b(I)=1 can be calculated by using the extended Euclidean algorithm. Then, by using a(I), b(I), w(I), S(M',I)=w(I)$^{a(I)}$·H(M')$^{b(I)}$ mod N is calculated as the integrated digital signature for the digital document to be signed M'.

Figure 5:
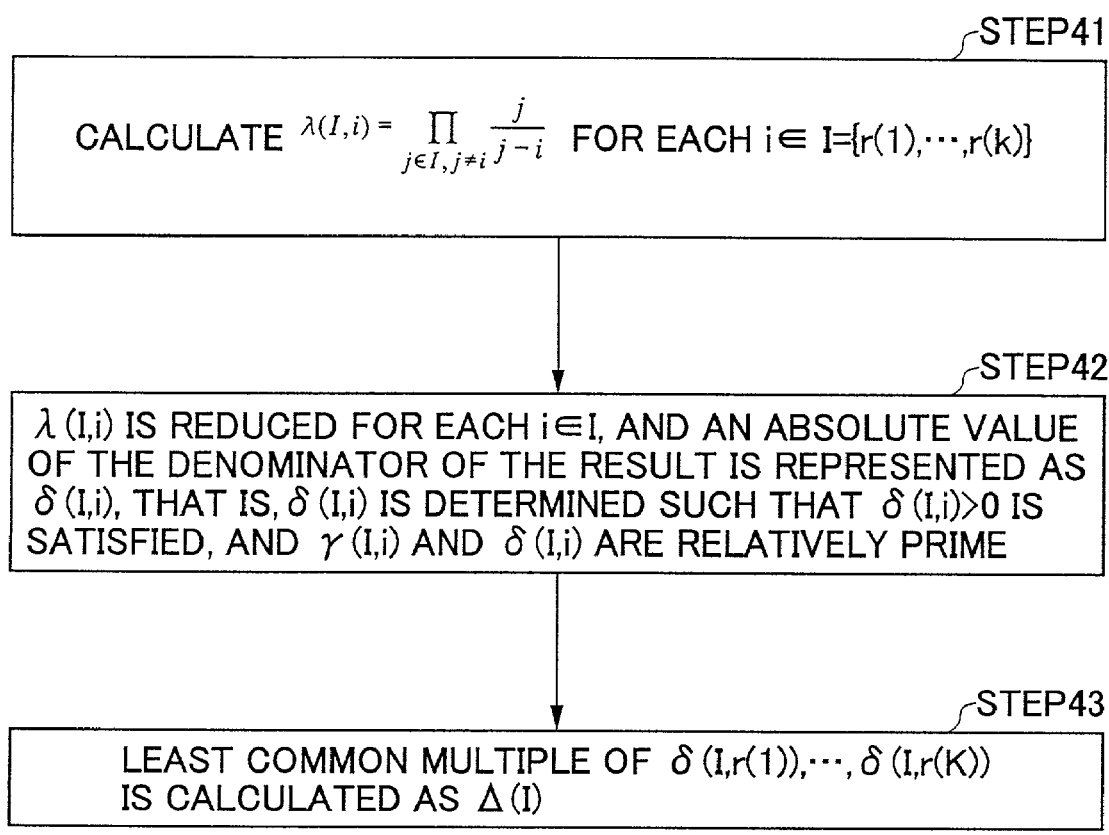
FIG. 5 shows a flowchart showing the calculation procedure of the transformation number for the partial digital signatures which minimizes time complexity according to an example of the present invention.

FIG. 5 shows a flowchart showing the calculation procedure of the transformation number for the partial digital signatures which minimizes time complexity according to an example of the present invention.

In the process for generating the integrated digital signature from the partial digital signature, it is necessary to select a transformation number Δ(I) for each set I={r(1), ..., r(k)} including the threshold number of the identification numbers of the partial digital signature generation parts 13 such that the positive integer Δ(I) and e are relatively prime and Δ(I)·λ(I,i) becomes an integer for each i∈I. As for the transformation number Δ(I), S. Miyazaki et al. "On threshold RSA-signing with no dealer" in Proceedings of ICISC'99, LNCS Vol.1787, pp. 197–207, Springer, 1999 proposes $((r-1)!)^2$ irrespective of I, wherein r is the total number of the partial signature generation parts. FIG. 5 shows a procedure for calculating the transformation number which is optimum in the sense that the time complexity required for generating the integrated digital signature from the partial digital signatures becomes the smallest, according to the set I of the identification numbers of the partial digital signature generation parts 13.

Assuming that the set I={r(1), ..., r(k)} of identification numbers of the threshold number of the partial digital signature generation parts 13 is given, $$\lambda(I, i) = \prod_{j \in I, j \neq i} \frac{j}{j-i}$$

is calculated for each i∈I in step 41.

Then, in step 42, λ(I,i) is reduced for each i∈I, and an absolute value of the denominator of the result is represented as δ(I,i), that is, δ(I,i) is determined such that $$\lambda(I, i) = \frac{\gamma(I, i)}{\delta(I, i)},$$

Where δ(I,i)>0, and γ(I,i) and δ(I,i) are relatively prime.

In step 43, the least common multiple Δ(I) of δ(I,r(1)), ..., δ(I,r(K)) is calculated.

In this way, the transformation number Δ(I) of the partial digital signature for I is obtained. Δ(I) is optimum in the sense that the time complexity of generating the integrated digital signature from the partial digital signatures by using Δ(I) becomes the smallest. In S. Miyazaki et al. "On threshold RSA-signing with no dealer" in Proceedings of ICISC'99, LNCS Vol.1787, pp. 197–207, Springer, 1999, it is proposed to use $((r-1)!)^2$ as Δ(I), with r being the total number of the partial digital signature parts. Compared with the method of using $((r-1)!)^2$ as Δ(I), it can be checked, by calculation, that the time complexity of generating the integrated digital signature from the partial digital signatures decreases to about ⅙ times of that of the conventional method when the threshold k is from 3 to 10 and the number r of the partial signature generation parts 13 is from 5 to 19.

Next, a procedure for judgment of the existence of an incorrect partial digital signature will be described.

Figure 6:
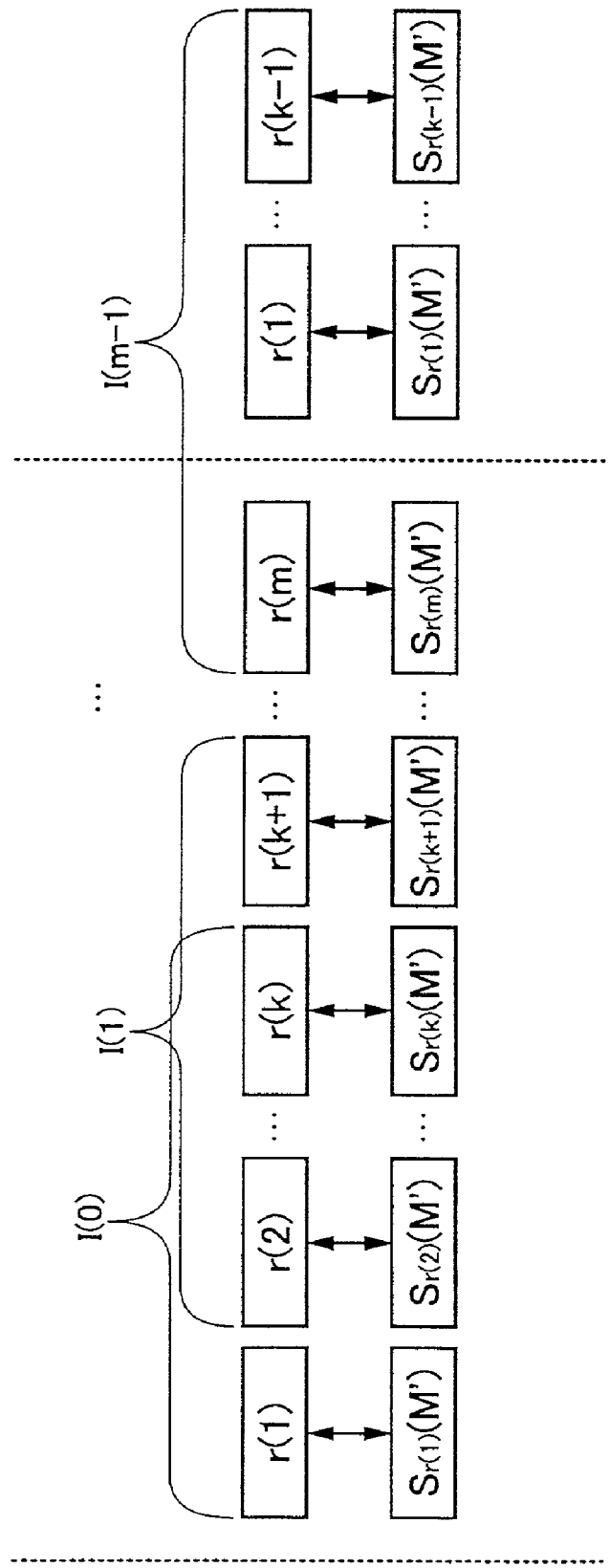
FIG. 6 is a figure for explaining a method of detecting an incorrect partial digital signature by using combinations of the partial digital signatures according to an example of the present invention.
Figure 7:
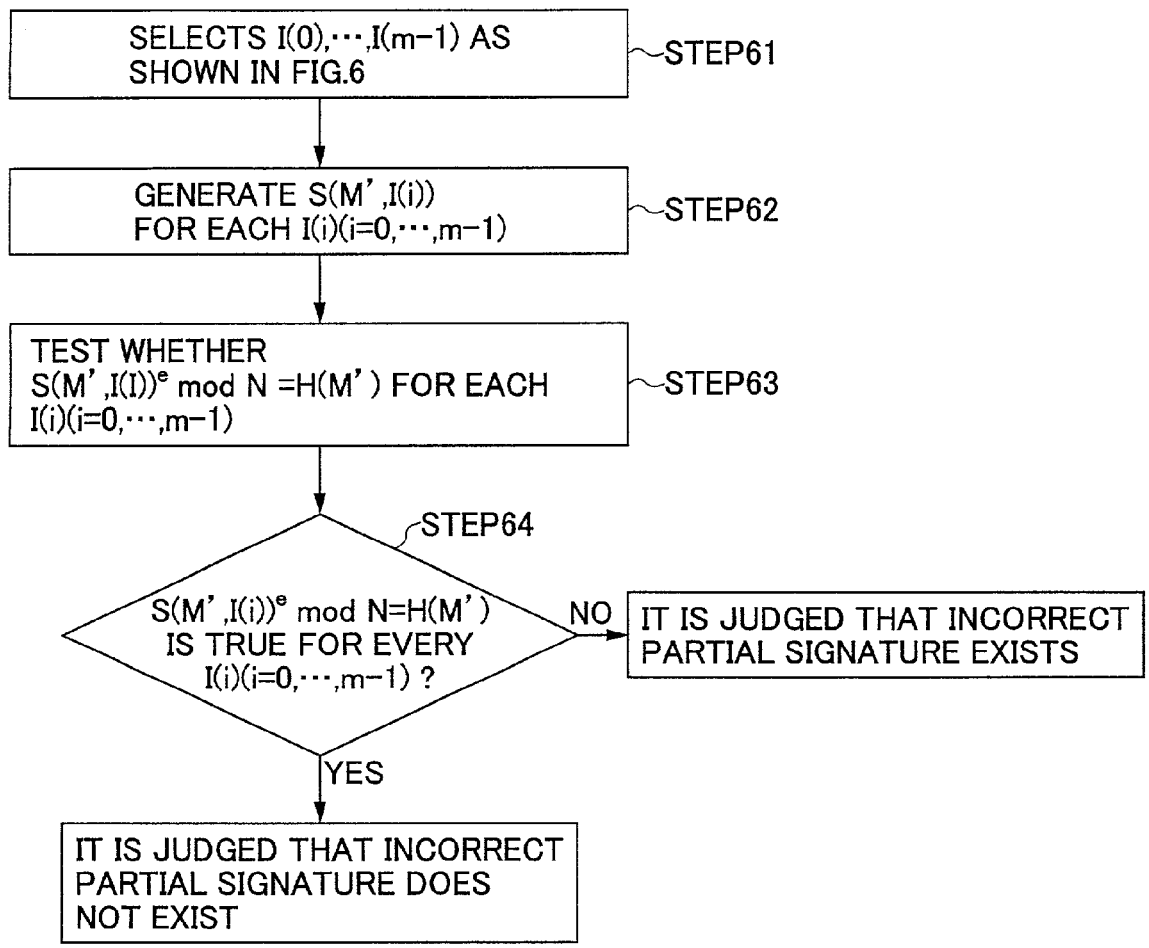
FIG. 7 shows a flowchart showing a procedure of judgment of existence of an incorrect partial digital signature by using combinations of the partial digital signatures according to an example of the present invention.
Figure 8:
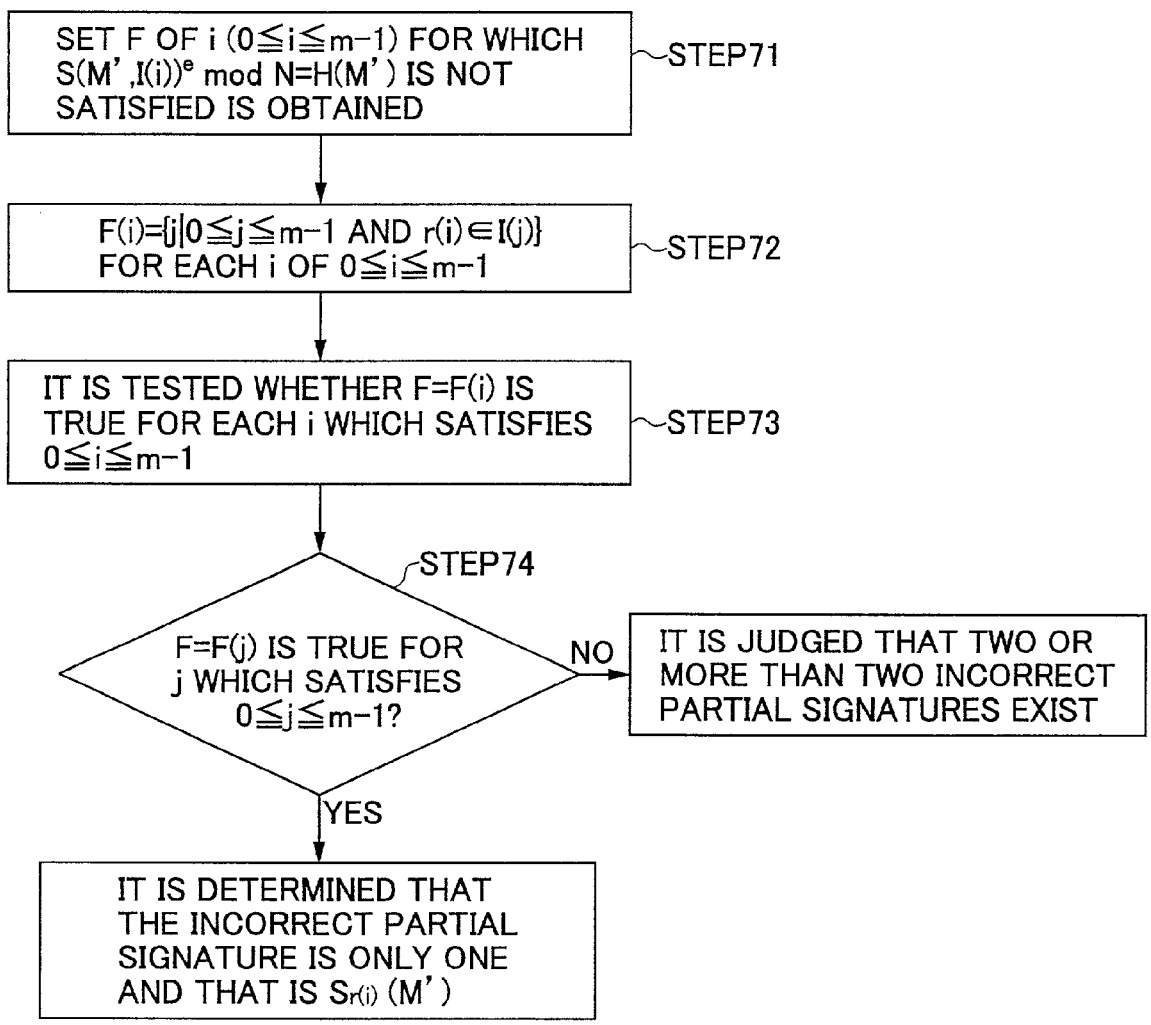
FIG. 8 is a flowchart of a procedure for judging whether the number of the incorrect partial digital signature is only one and determining the incorrect partial digital signature.

FIG. 6 is a figure for explaining a method of detecting an incorrect partial digital signature by using combinations of the partial digital signatures according to an example of the present invention. FIG. 7 shows a flowchart showing a procedure of judgment of the existence of an incorrect partial digital signature by using combinations of the partial digital signatures according to an example of the present invention. FIG. 8 is a flowchart of a procedure for judging whether the number of the incorrect partial digital signatures is only one and for determining the incorrect partial digital signature.

By using these figures, the procedure for judging the existence of an incorrect partial signature generated by an incorrect partial signature key and identifying the incorrect partial signature will be described, where the integrated digital signature generation part 14 performs the signature verification procedure by combining the threshold number of partial signatures in the threshold distributed digital signature generation apparatus shown in FIGS. 2, 3 and 4.

Assuming that k is the threshold necessary for generating an integrated digital signature from a partial digital signatures, the integrated digital signature generation part 14 shown in FIGS. 2, 3 and 4 can generate an integrated digital signature S(M',I) from k partial digital signatures $S_{r(1)}(M'), \ldots, S_{r(k)}(M')$ each of which is output from different partial signature generation part 13 and has the same digital document to be signed, where $r(1), \ldots, r(k)$ are different from each other and $1 \leq r(1) \ldots, r(k) \leq r$, wherein M' is the digital document to be signed of $S_{r(k)}$ (M') and $I = \{r(1), \ldots, r(k)\}$.

For various kinds of combinations each including k partial digital signatures, the integrated digital signature generation part 14 judges whether the generated S(M',I) is a proper signature of the digital document to be signed M' by verifying whether the decoding of S(M',I) by using the public key (e, N) coincides with the hash value H(M') of the digital document to be signed. Thereby, it can be judged whether S(M',I) is a correct digital signature for the initially provided digital document.

As described earlier in the configuration shown in FIGS. 2 and 3, the digital document to be signed M' of the digital signature S(M',I) is M which does not include the additional information. In the configuration shown in FIG. 4, the digital document to be signed M' of the digital signature S(M',I) is M||α which includes the additional information α.

The digital document M' to be signed is input to the integrated digital signature generation part at the start, in the configuration of FIG. 2. In the configuration of FIGS. 3 and 4, the digital document M' to be signed is output to the integrated digital signature generation part 14 by the partial digital signature generation part 13i ($1 \leq i \leq r$) shown in FIGS. 3 and 4, with the partial digital signature $S_i$ (M').

In the following, a procedure for judging whether an incorrect partial signature exists in the set of partial digital signatures $S_{r(1)}$ (M') ..., $S_{r(m)}$ (M') whose digital document to be signed is M' and which are sent from the partial digital signature generation parts 13 shown in FIGS. 2, 3 and 4 will be described by using FIG. 7, wherein this procedure is applied when there are correct partial signatures whose number is at least k-1 with k being the threshold necessary for generating an integrated signature. In this procedure, it is assumed that $r(1), \ldots, r(m)$ are different from each other and $k+1 \leq m \leq r$. The reason that m is not assumed to be equal to r is that there is a possibility that a part of the partial digital signature generation parts operate incorrectly and do not send partial digital signatures.

As shown in FIG. 6, m subsets $I(0), \ldots, I(m-1)$ of $\{r(1), \ldots, r(m)\}$ are selected such that each I(i) consisting of k elements and $I(i) = (r(((j+i) \bmod m) + 1) | 0 \leq j \leq k-1)$ (I=0, ..., m-1) in step 61.

The integrated digital signature S (M',I(i) is generated from $\{S_{r(j)}$ (M')|r(j)∈I(i)\} for each I(i) (i=0, ..., m-1) in step 62.

Then, it is tested whether the decoding $S(M',I(i))^e \bmod N$ of the integrated digital signature by the public key (e, N) coincides with H(M') for each I(i) (i=0, ..., m-1) in step 63.

The next step 64 of FIG. 7 is performed as follows:

If it is verified that $S(M', I(i))^e \bmod N = H(M')$ for every I(i) (i=0, ..., m-1) in step 63, it is judged that an incorrect partial signature doe not exist in $S_{r(1)}$ (M'), ..., $S_{r(m)}$ (M'). There may be a possibility that there are more than one incorrect digital signatures in m partial digital signatures $S_{r(1)}$ (M'), ..., $S_{r(m)}$ (M') and the incorrect digital signatures cancel their incorrect effects by conspiring with each other so that the integrated digital signature S(M', I(i)) generated from $S_r$(M')(r∈I(i)) for each I(i) ($0 \leq i \leq m-1$) becomes a correct signature. However, it can be verified that such a case does not occur when $k+1 \leq r \leq 2 \cdot k-1$ and $3 \leq k \leq 10$ by a test using a computer.

Next, a procedure is described for determining whether the number of the incorrect partial digital signatures is only one and identifying the only one incorrect partial digital signature.

According to a procedure shown in FIG. 8, when there are correct partial signatures whose number is at least the threshold k in m partial digital signatures $S_{r(1)}$ (M'), ..., $S_{r(m)}$ (M'), and, when it is judged that there is an incorrect digital signature in $S_{r(1)}$ (M'), ..., $S_{r(m)}$ (M') by using the procedure shown in FIG. 7, it is judged whether the number of the incorrect partial digital signatures is only one, and the incorrect partial digital signature is determined when it is judged that the number of the incorrect partial digital signatures is only one.

Step 71 determine the set F of i ($0 \leq i \leq m-1$) for which $S(M',I(i))^e \bmod N = H(M')$ is not satisfied. This judgement is also performed in step 63 in FIG. 7. Thus, this step can be performed simultaneously when the procedure of FIG. 7 is performed.

In step 72, F(i) is determined to be $\{j|0 \leq j \leq m-1$ and $r(i) \in I(j)\}$ for each i with $0 \leq i \leq m-1$.

In step 73, when there is i such that $0 \leq i \leq m-1$ and F=F(i) is true, it is decided that the only incorrect partial signature is $S_{r(i)}$ (M'). Otherwise, it is judged that two or more than two incorrect partial signatures exist in $S_{r(1)}$ (M'), ..., $S_{r(m)}$ (M).

If there is any j ($0 \leq j \leq m-1$) which satisfies F=F(j), the number of j is at most one.

There may be a possibility that there is more than one incorrect digital signature in m partial digital signatures $S_{r(1)}$ (M'), ..., $S_{r(m)}$ (M') and their incorrect digital signatures cancel incorrect effects by conspiring with each other so that F=F(i) becomes true for an i ($1 \leq i \leq m$) in step 74. However, it can be verified that such a case does not occur when $k+1 \leq r \leq 2 \cdot k-1$ and $3 \leq k \leq 10$ by a test using a computer.

In the following, evaluation of time complexity of the above-mentioned procedures will be shown.

In the following evaluation, it is assumed that k is the number of the partial digital signatures necessary for generating an integrated digital signature, that is, k is the threshold, r is the number of the partial digital signature generation parts, $3 \leq k \leq 10$, and $r = 2 \cdot k - 1$ for each k.

In the case that the length of the key is of 2048-bits, by using the number of multiplications mod N for evaluating the time complexity of judging whether there is any incorrect partial digital signature and of deciding whether the number of the incorrect partial digital signatures is only one and of identifying the only one partial digital signature, the time complexity becomes 0.12 times of the time complexity of generating a partial signature when k=3, the time complexity becomes 0.20 times of the time complexity of generating a partial signature when k=4, the time complexity becomes 0.32 times of the time complexity of generating a partial signature when k=5, the time complexity becomes 0.49 times of the time complexity of generating a partial signature when k=6, the time complexity becomes 0.75 times of the time complexity of generating a partial signature when k=7, the time complexity becomes 1.0 times of the time complexity of generating a partial signature when k=8, the time complexity becomes 1.5 times of the time complexity of generating a partial signature when k=9, the time complexity becomes 2.1 times of the time complexity of generating a partial signature when k=10.

In the conventional verification methods disclosed in T. Wu et al. "Building intrusion tolerant applications", in Proceedings of 8th USENIX Security Symposium, USENIX, 1999 and in S. Miyazaki et al. "On threshold RSA-signing with no dealer" in Proceedings of ICISC'99 LNCS Vol. 1787, pp. 197–207, Springer, 1999, time complexity is 4 times of that of generating partial signature since the partial digital signature generation part generates data for verifying validity of a partial signature in addition to the partial digital signature itself, sends the data to the integrated digital signature generation part and the integrated digital signature part verifies the validity of each partial digital signature. Therefore, in order to verify the validity of each partial signature sent from each partial signature generation part, the time complexity becomes equal to or larger than 20 times of time complexity of generating a partial signature when k=3, the time complexity becomes equal to or larger than 28 times of time complexity of generating a partial signature when k=4, the time complexity becomes equal to or larger than 36 times of time complexity of generating a partial signature when k=5, the time complexity becomes equal to or larger than 44 times of time complexity of generating a partial signature when k=6, the time complexity becomes equal to or larger than 52 times of time complexity of generating a partial signature when k=7, the time complexity becomes equal to or larger than 60 times of time complexity of generating a partial signature when k=8, the time complexity becomes equal to or larger than 68 times of time complexity of generating a partial signature when k=9, the time complexity becomes equal to or larger than 76 times of time complexity of generating a partial signature when k=10.

When comparing the two evaluations of the time complexity, it can be understood that the verification method of the present invention for detecting incorrect partial signatures has the merit that the time complexity is small, for the above-mentioned key length, the number of thresholds, and the total number of partial digital signature parts.

Next, a method using all available integrated digital signatures will be described.

When the number of the partial digital signature generation parts is small, there is a case where incorrect partial signatures can be identified even when the number of the incorrect partial signatures is equal to or more than 2 by testing whether $S(M',J(i))^e \mod N=H(M)$ is satisfied for all subsets $J(1), \ldots, J(K)$ consisting of k elements of $\{r(1), \ldots, r(m)\}$ for the set of digital signatures $S_{r(1)}(M'), \ldots, S_{r(m)}(M')$ which are generated by the partial digital signature generation parts independently and whose digital document to be signed is the same, and by analyzing the correspondence between $J(i)$ and the result of the test. Here, K is the total number of combinations for selecting k elements from m elements, that is, $m!/(k! \cdot (m-k)!)$. For example, when the threshold for generating the integrated digital signature is 3, the total number of the partial digital signature generation parts is 5 and 5 partial digital signatures whose digital documents to be signed coincide are collected, it can be checked that it can be determined which partial signatures are incorrect even when the number of the incorrect partial signatures is at most two by enumerating all cases.

Next, a digitally signed digital document generation apparatus using combination of the threshold number of partial signatures will be described by using FIGS. 9 and 10.

Figure 9:
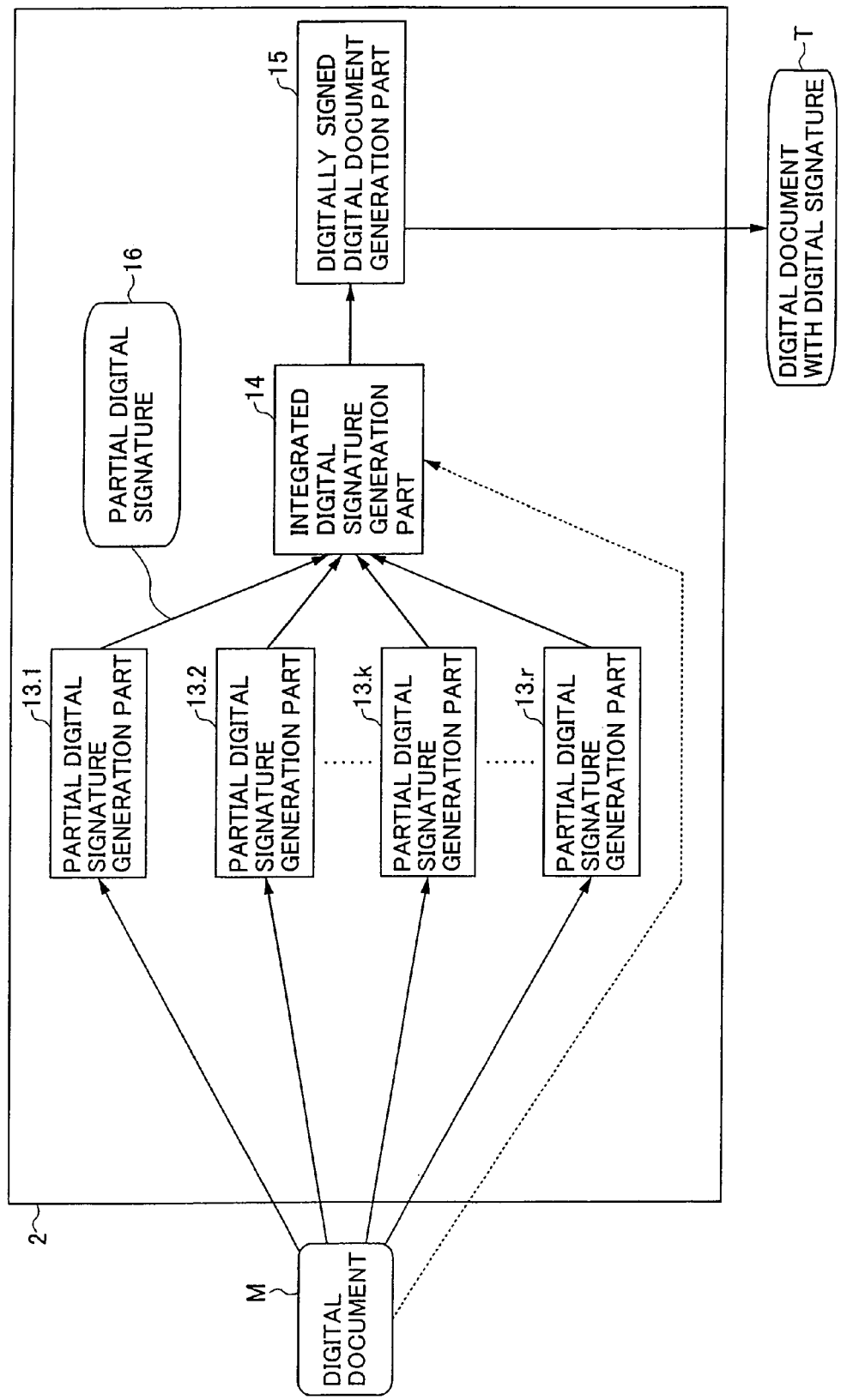
FIG. 9 is a block diagram showing a digitally signed digital document generation apparatus using the combination of the threshold number of partial signatures (first example) according to an example of the present invention.
Figure 10:
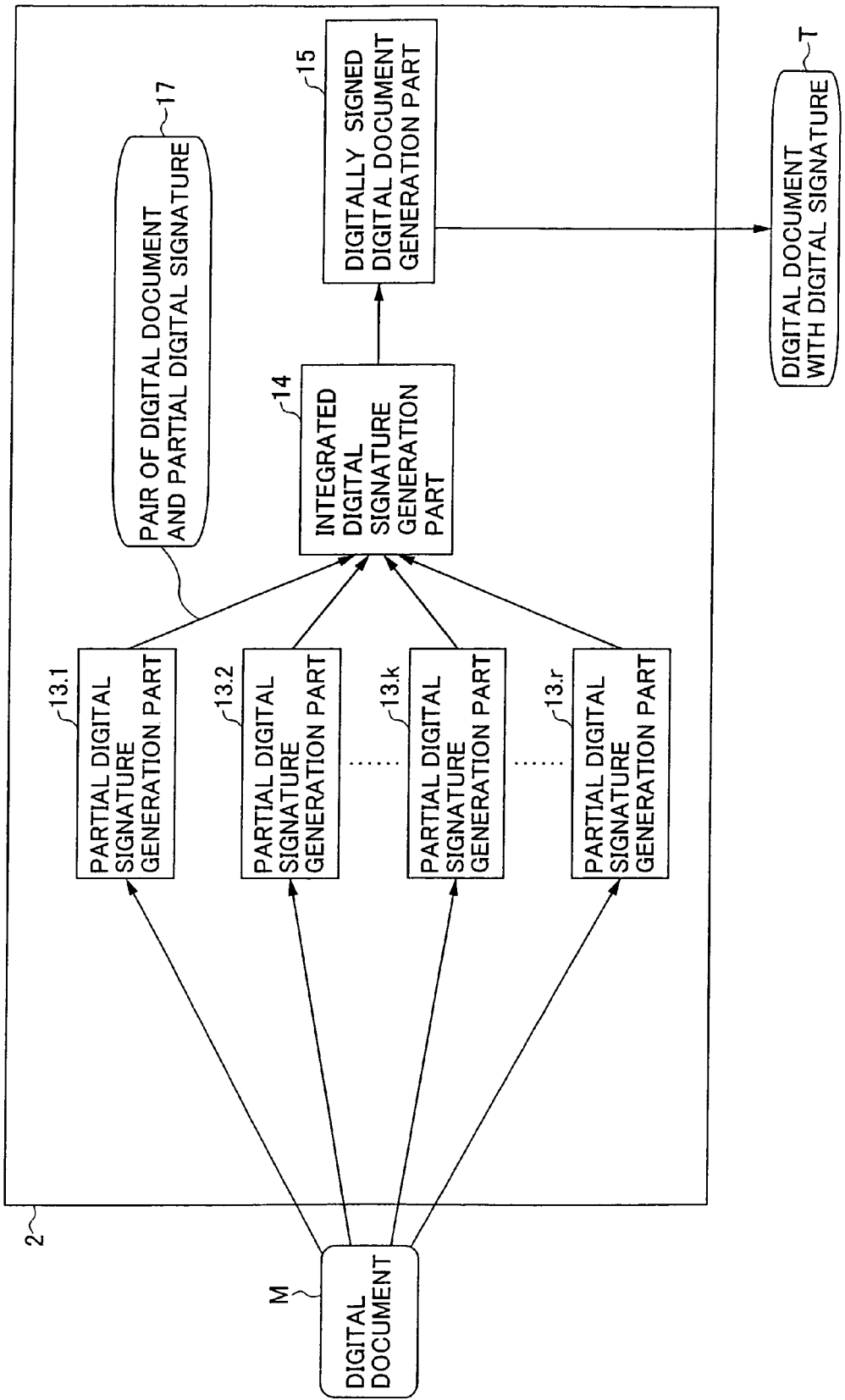
FIG. 10 is a block diagram showing a digitally signed digital document generation apparatus using the combination of the threshold number of partial signatures (second example) according to an example of the present invention.

FIG. 9 is a block diagram showing a digitally signed digital document generation apparatus using combination of the threshold number of partial signatures (first example) according to an example of the present invention, FIG. 10 is a block diagram showing a digitally signed digital document generation apparatus using combination of the threshold number of partial signatures (second example) according to an example of the present invention.

As shown in FIGS. 9 and 10, the distributed digital signature generation apparatus 2 includes a certain number of partial digital signature generation parts $13_1, \ldots, 13_r$, an integrated digital signature generation part 14 and a digitally signed digital document generation part 15.

The partial digital signature generation parts $13_1, \ldots, 13_r$ generate partial digital signatures $S_1(M), \ldots, S_r(M)$ for an input digital document M independently of each other.

The integrated digital signature generation part 14 receives m partial digital signatures $S_{r(1)}(M), \ldots, S_{r(M)}(M)$, ($k \leq m \leq r$ and $k \leq r(1), \ldots, r(m) \leq r$) which are generated by the certain number of partial digital signature generation parts 13 and the digital document M. Then, the integrated digital signature generation part 14 generates a certain number of integrated digital signatures $S(M,I_1), \ldots, S(M,I_s)$ from the output partial digital signatures for s sets $I_1, \ldots, I_s$ each consisting of identification numbers of k partial digital signature generation parts 13, where s is equal to or larger than 1 and k is the predetermined threshold number.

The digitally signed digital document generation part 15 generates a digital document with digital signature for an input digital document by combining the generated integrated digital signature and the digital document.

Figure 11:
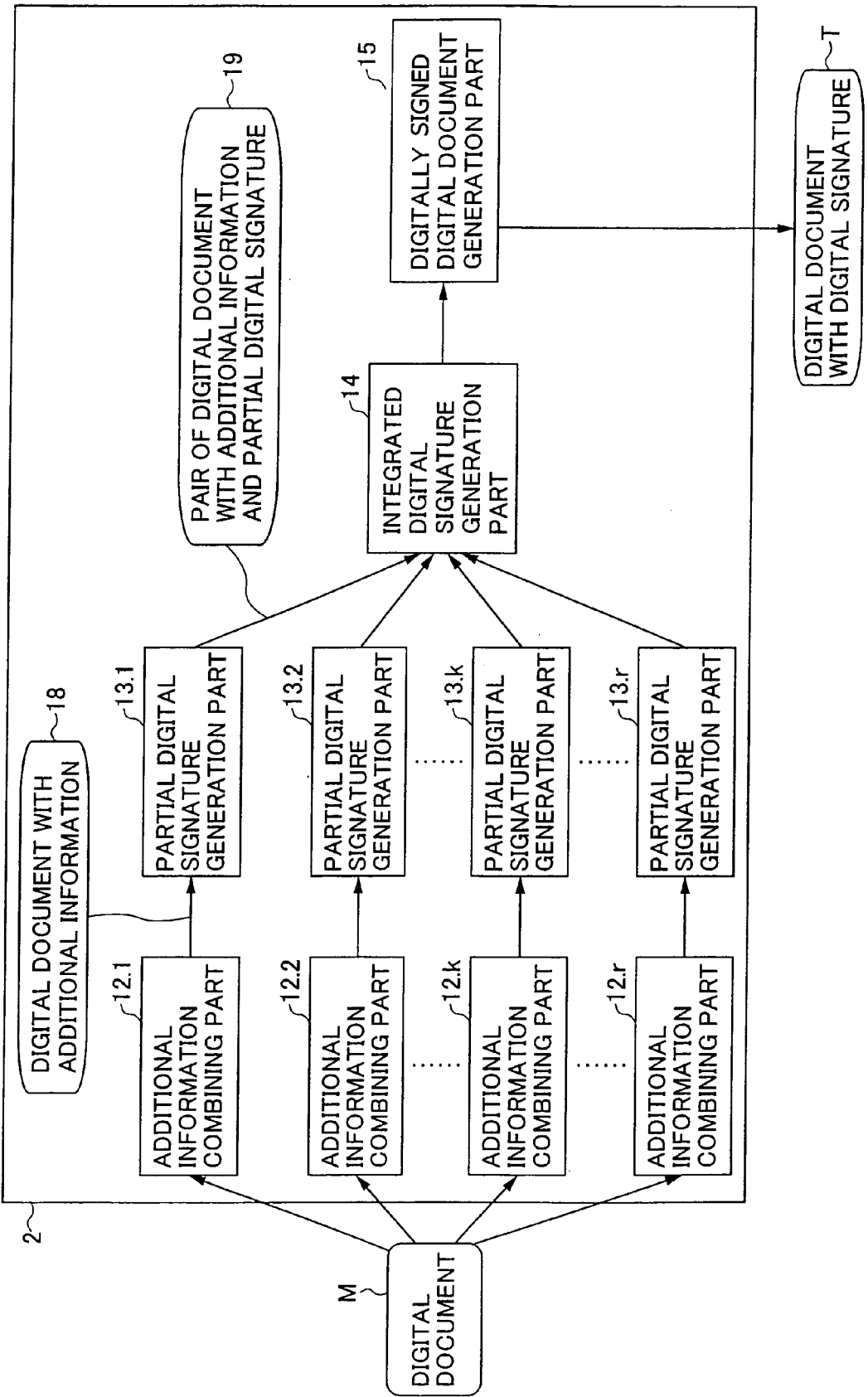
FIG. 11 is a block diagram showing a digitally signed digital document generation apparatus using the combination of the threshold number of partial signatures (third example) according to an example of the present invention

Next, an example in which additional information combining parts are provided to the configuration is shown in FIGS. 9 and 10. FIG. 11 shows a block diagram of the digitally signed digital document generation apparatus (third example) using combinations of threshold number of partial signatures according to an example of the present invention.

As shown in the figure, the distributed digital signature generation apparatus 2 includes a certain number of additional information combining parts $12_1, \ldots, 12_r$, a certain number of partial digital signature generation parts 13, an integrated digital signature generation parts 14 and a digitally signed digital document generation part 15.

Each of the additional information combining parts 12 (the additional information combining part 12.i) generates $v(i)$ items of additional information $\alpha(i, 1), \ldots, \alpha(i, v(i))$ for the input digital document M independently, where $v(i)$ is a number equal to or larger than 1, and generates digital documents with additional information $M\|\alpha(i,1), \ldots, M\|\alpha(i, v(i))$ which are generated by combining the additional information $\alpha(i,1), \ldots, \alpha(i, v(i))$ and the digital document M.

Each of the digital signature generation parts (the digital signature generation part 13.i) generates pairs of the digital document with the additional information and the partial digital signatures $(M\|\alpha(i,1), S_1(M\|\alpha(i,1))), \ldots, (M\|\alpha(i, v(i)), S_1(M\|\alpha(i, v(i))))$ for the digital document with additional information.

The integrated digital signature generation part 14 receives m pairs of the digital document with additional information and the partial digital signature $(M', S_{r(1)}(M')), \ldots, (M',S_{r(m)}(M'))$ in which $k \leq m \leq r$ and $k \leq r(1), \ldots, r(m) \leq r$ are satisfied. Then, the integrated digital signature generation part 14 generates s integrated digital signatures $S(M',I_1), \ldots, S(M',I_s)$ from the output partial digital signatures for s sets $I_1, \ldots, I_s$ each consisting of k identification numbers of the partial digital signature generation parts, where k is the predetermined threshold.

The digitally signed digital document generation part 15 generates a digital document with digital signature T for an input digital document with additional information by combining the generated integrated digital signature and the digital document with additional information.

Although the above-mentioned examples are described on the basis of each configuration, the partial digital generation part, the integrated digital signature generation part and the additional information combining part in the distributed digital signature generation apparatus shown in FIGS. 2–4 can be realized by programs. These programs can be installed in a computer used as the distributed digital signature generation apparatus.

In addition, the programs can be stored in a recording medium such as a hard disk, a floppy disk, CD-ROM and the like, and can be installed to the computer from the recording medium.

In addition, the partial digital generation part, the integrated digital signature generation part, the additional information combining part and the digitally signed digital document generation part in the digital document with distributed digital signature generation apparatus shown in FIGS. 10 and 11 can be realized by programs These programs can be installed in a computer used as the distributed digital signature generation apparatus In addition, the programs can be stored in a recording medium such as a hard disk, a floppy disk, CD-ROM and the like, and can be installed to the computer from the recording medium.

Effect of the Present Invention

As mentioned above, according to the threshold type distributed digital signature generation apparatus of the present invention, since the trusted third party is not included, the single point of compromise which brings about leaking of secret key can be removed. Thus, the safety of the signature system whose most important part is the safety of secret key is improved. At the same time, since it is allowed to generate the digital signatures when only predetermined number of partial digital signature generation systems in a certain number of partial digital signature generation systems operate correctly, robustness against security attacks and fault tolerance in the digital signature system can be improved. Accordingly, a distributed digital signature generation system which is safe and has good robustness against security attacks and fault tolerance can be realized.

Especially, according to the present invention, when the integrated digital signature is generated from the partial digital signatures, since the least common multiple of $\delta(I,r(1)), \ldots, \delta(I,r(K))$ is used instead of $((r-1)!)^2$ as the transformation number $\Delta(I)$ in $\Delta(I) \cdot \lambda(I,i)$, the time complexity of generating the integrated digital signature from the partial digital signatures can be decreased.

In addition, in verification of the partial digital signatures, since the verification is performed by generating m integrated digital signatures by using m sets $I(0), \ldots, I(m-1)$ each including k partial digital signatures as shown in FIG. 6, the time complexity for the verification can be decreased.

In the following, the decreasing effect of the time complexity when the integrated digital signature is generated from the partial digital signatures and the decreasing effect of the time complexity of the verification of the partial digital signatures will be described.

FIG. 12 shows the decreasing effect of the time complexity by optimization of the process in which the integrated digital signature is generated from the partial digital signatures. The number of multiplications mod N is used for evaluating the time complexity. The other method to be compared with is a method proposed in S. Miyazaki, K. Sakurai, M. Yung "On threshold RSA-signing with no dealer" in Proceedings of ICISC'99, pp. 197–207, Springer, 1999 in which $((n-1)!)^2$ is used as the transformation number, wherein n is the total number of servers (which correspond to the partial digital signature generation parts in the above-mentioned examples)

In FIG. 12, k indicates the number of necessary servers for generating a signature, r indicates the total number of servers, A indicates the average bit-length of power exponents necessary for calculating w(I) (when $\Delta(I)$ is optimized), B indicates the average bit-length of power exponents necessary for calculating w(I) (when $\Delta(I)=((r-1)!)^2$), and B/A indicates the decreasing ratio of te time complexity.

FIGS. 13 and 14 show the decreasing effect of the time complexity of verifying of partial signatures. FIG. 13 shows a case when bit length of the key is 1024 and FIG. 14 shows a case when bit length of the key is 2048. The other method to be compared with is a method proposed in Wu et al. "Building intrusion tolerant applications", in Proceedings of 8th USENIX, 1999.

In FIGS. 13 and 14, k indicates the number of necessary servers for generating a signature, r indicates the total number of servers, A indicates the number of multiplications of mod N necessary for signature verification for one group (shown in FIG. 6, which can be called a sliding group), B indicates the number of multiplication of mod N necessary for signature verification for every group (including the overhead, evaluated as a number of multiplications mod N, of computing inverses mod N by using the extended Euclidean algorithm), C indicates the number of multiplications mod N necessary for verification of one partial signature when using the conventional method of Wu et. al, D indicates the number of multiplications mod N necessary for verification of all partial signatures ($=r \times C$) when using the conventional method of Wu et al, D/B indicates the decreasing ratio of the time complexity=C/A.

In the evaluations shown in FIGS. 12–14, it is assumed that power operation is realized by repeating multiplication by using square-and-multiply, and that the power operation is realized by multiplications whose number is 1.5 times the bit length of the exponent in average. The square-and-multiply is commonly used as a method for realizing power operation efficiently.

As shown in FIG. 12, according to the method of the present invention, the time complexity of generating the integrated digital signature from the partial digital signatures becomes about $\frac{1}{6}$ times of that of the conventional method.

In addition, when the bit length of the key is 1024, as shown in FIG. 13, the time complexity of verifying the validity of all partial signatures is largely decreased to $\frac{1}{85}$ when the number of the servers is 5, and to $\frac{1}{18}$ when the number of the servers is 19. As shown in FIG. 14, when the bit length of the key is 2048, the effect of time complexity decreasing is doubled. In this evaluation, time complexity of computing inverses mod N by using the extended Euclidean algorithm which is included in the verification processing is evaluated on the basis of actual measurement by a program written in C implementing the extended Euclidean algorithm for computing inverses mod N. When the key length is 1024, the calculation is evaluated as 9.3 times a multiplication mod N, and, when the key length is 2048, the calculation is evaluated as 13 times a multiplication of mod N.

According to the method which has been conventionally proposed, the time complexity of verifying validity of all partial signatures becomes much larger than that of generating the signatures. In the above-mentioned methods of Wu, the time complexity of verifying one partial signature is four times of that of generating the partial signature, and the whole time complexity is one multiplied by the number of servers. Therefore, when using the conventional method, it is not practical to verify the validity of all partial signatures every time when the signature is generated. For example, in the system proposed in the article of Wu, only when an incorrect integrated signature is detected, the verification of partial signatures used for generating the integrated signature is performed.

When using the verification method of validity of partial signatures of the present invention, since the time complexity can be largely decreased as described above, a system which verifies the validity of all partial signatures every time when the signature is generated can be realized.

The present invention is not limited to the specifically disclosed embodiments, and variations and modifications may be made without departing from the scope of the invention.

What is claimed is:

1. A distributed digital signature generation method for generating a digital signature for a digital document (M) by using a plurality of partial digital signature generation parts, said distributed digital signature generation method comprising:

a partial digital signature generation step in which each of said partial digital signature generation parts generates a partial signature key by communicating with each other without using a trusted third party, generates a partial digital signature by using said partial signature key for a hash value (H(M)) of an input digital document (M), and outputs said partial digital signature or a pair of said digital document and said partial digital signature;

a partial digital signature number set selecting step of assigning one of numbers from 1 to m to each of said partial digital signatures wherein m is the number of said partial digital signatures, selecting a number set $I(i)$ including numbers $((i-1) \mod m)+1, ((i-1+1) \mod m)+1, \ldots, ((i-1+(k-1)) \mod m)+1$ for each of $i=1, \ldots, m$, wherein k is a threshold necessary for generating an integrated digital signature;

an integrated digital signature generating step of combining said partial digital signatures $S(i(1), M), \ldots, S(i(k), M)$ to generate said integrated digital signature $S(I(i), M)$ for each of $i=1, \ldots, m$ wherein $S(i, M)$ indicates a partial digital signature to which i is assigned and wherein elements of said number set $I(i)$ are $i(1), \ldots, i(k)$, wherein said integrated digital signature generating step includes:

a signature verification step of performing a signature verification process for said integrated digital signature $S(I(i), M)$ for each of $i=1, \ldots, m$ to determine whether said integrated digital signature $S(I(i), M)$ is a correct digital signature for H(M);

an incorrect partial digital signature existence determination step of determining that no incorrect partial digital signature exists in said partial digital signatures $S(i, M)$ $(i=1, \ldots, m)$ if $S(I(i), M)$ is determined to be a correct digital signature for H(M) for every $i=1, \ldots, m$, and determining that at least an incorrect partial digital signature exists if at least one of $S(I(i), M)$ $(i=1, \ldots, m)$ is determined to be incorrect;

an incorrect partial digital signature specifying step, performed when it is determined that at least one incorrect partial digital signature exists, of determining whether a set F of $i=1, \ldots, m$ agrees with a set $F(j)$ (j is one of $1, \ldots, m$), wherein said set F is defined to be the set of $i=1, \ldots, m$ such that $S(I(i), M)$ is incorrect for H(M), and wherein said set $F(j)$ is the set of $i=1, \ldots, m$ by which said number set $I(i)$ includes j, and determining that the number of said incorrect partial digital signature is only one if there is only one j by which F agrees with said set $F(j)$, and if not, determining that the number of said incorrect partial digital signatures is equal to or greater than 2, and further, when it is determined that the number of said incorrect partial digital signature is only one, determining said only one j by which F agrees with $F(j)$ so as to specify that said only one incorrect partial digital signature is $S(j, M)$; and said distributed digital signature generation method further comprising a result output step of:

when it is determined that no incorrect partial digital signature exists, outputting a determination result indicating that no incorrect partial digital signature exists and said integrated digital signature determined to be correct in said signature verification step;

when it is determined that only one incorrect partial digital signature exists, outputting a determination result indicating that only one incorrect partial digital signature exists, identification information of said only one incorrect partial digital signature, and said integrated digital signature determined to be correct in said signature verification step;

when it is determined that the number of said incorrect partial digital signatures is equal to or greater than 2, outputting a determination result indicating that the number of said incorrect partial digital signatures is equal to or greater than 2.

2. A digitally signed digital document generation method for generating a digital document with a digital signature comprising the distributed digital signature generation method as claimed in claim 1, and further comprising the step of:

generating a digital document with digital signature which includes said digital document and said integrated digital signature.

3. A computer readable medium storing a program for causing a computer to generate a digital signature for a digital document by using a plurality of partial digital signature generation parts, comprising:

each of said partial digital signature generation parts generates a partial signature key by communicating with each other without using a trusted third party, generates a partial digital signature by using said partial signature key for a hash value (H(M)) of an input digital document (M), and outputs said partial digital signature or a pair of said digital document and said partial digital signature;

said program comprising:

integrated digital signature generating program code means for assigning one of numbers from 1 to m to each of said partial digital signatures wherein m is the number of said partial digital signatures, selecting a number set $I(i)$ including numbers $((i-1) \mod m)+1, ((i-1+1) \mod m)+1, \ldots, ((i-1+(k-1)) \mod m)+1$ for each of $i=1, \ldots, m$, wherein k is a threshold necessary for generating an integrated digital signature; and for combining said partial digital signatures $S(i(1), M), \ldots, S(i(k), M)$ to generate said integrated digital signature $S(I(i), M)$ for each of $i=1, \ldots, m$ wherein $S(i, M)$ indicates a partial digital signature to which i is assigned and wherein elements of said number set $I(i)$ are $i(1), \ldots, i(k)$, wherein said integrated digital signature generating program code means includes:

signature verification program code means for performing a signature verification process for said integrated digital signature $S(I(i), M)$ for each of $i=1, \ldots, m$ to determine whether said integrated digital signature $S(I(i), M)$ is a correct digital signature for $H(M)$;

incorrect partial digital signature existence determination program code means for determining that no incorrect partial digital signature exists in said partial digital signatures $S(i, M)$ $(i=1, \ldots, m)$ if $S(I(i), M)$ is determined to be a correct digital signature for $H(M)$ for every $i=1, \ldots, m$, and determining that at least an incorrect partial digital signature exists if at least one of $S(I(i), M)$ $(i=1, \ldots, m)$ is determined to be incorrect;

incorrect partial digital signature specifying program code means for, when it is determined that at least one incorrect partial digital signature exists, determining whether a set F of $i=1, \ldots, m$ agrees with a set $F(j)$ (j is one of $1, \ldots, m$), wherein said set F is defined to be the set of $i=1, \ldots, m$ such that $S(I(i), M)$ is incorrect for $H(M)$, and wherein said set $F(j)$ is the set of $i=1, \ldots, m$ by which said number set $I(i)$ includes j, and determining that the number of said incorrect partial digital signature is only one if there is only one j by which F agrees with said set $F(j)$, and if not, determining that the number of said incorrect partial digital signatures is equal to or greater than 2, and further when it is determined that the number of said incorrect partial digital signature is only one, determining said only one j by which F agrees with $F(j)$ so as to specify that said only one incorrect partial digital signature is $S(j, M)$; and said program further comprising result output program code means for:

when it is determined that no incorrect partial digital signature exists, outputting a determination result indicating that no incorrect partial digital signature exists and said integrated digital signature determined to be correct in said signature verification step;

when it is determined that only one incorrect partial digital signature exists, outputting a determination result indicating that only one incorrect partial digital signature exists, identification information of said only one incorrect partial digital signature, and said integrated digital signature determined to be correct in said signature verification step;

when it is determined that the number of said incorrect partial digital signatures is equal to or greater than 2, outputting a determination result indicating that the number of said incorrect partial digital signatures is equal to or greater than 2.

* * * * *